May 7, 1957
R. A. DAVIS
2,791,056
ARTIFICIAL FISHING LURE FUNCTIONING
IN COMBINATION WITH BAIT FISH
Filed Jan. 3, 1955
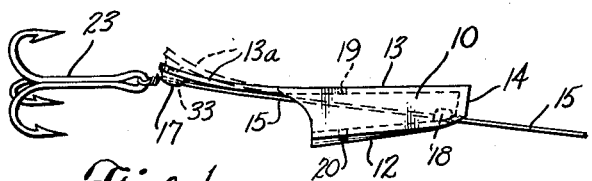
Fig. 1.
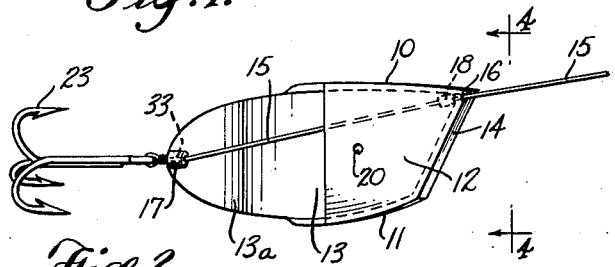
Fig. 2.
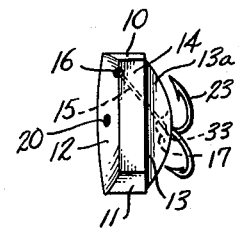
Fig. 4.
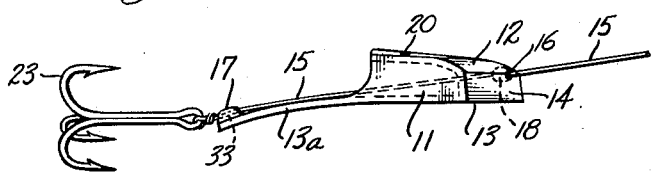
Fig. 3.
Fig. 6.
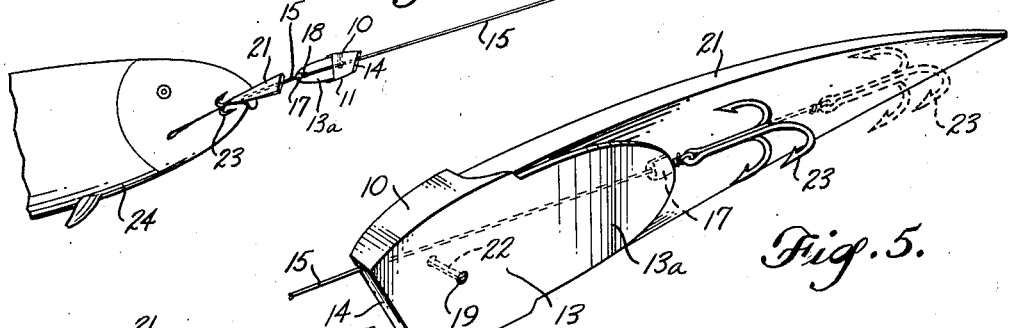
Fig. 5.
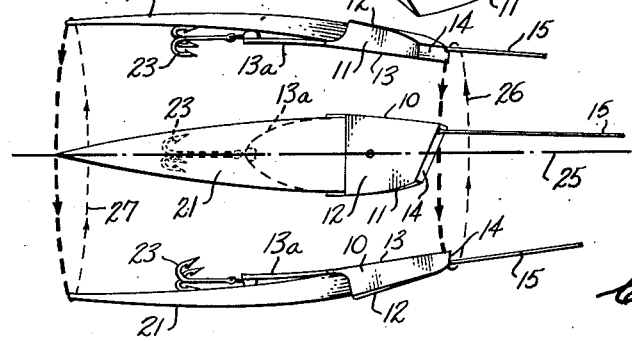
Fig. 7.
INVENTOR.
RHYS A. DAVIS
BY
Clinton L. Mathis
ATTORNEY

United States Patent Office 2,791,056
Patented May 7, 1957

2,791,056

ARTIFICIAL FISHING LURE FUNCTIONING IN COMBINATION WITH BAIT FISH

Rhys A. Davis, Sidney, British Columbia, Canada

Application January 3, 1955, Serial No. 479,587

1 Claim. (Cl. 43—41)

My invention relates to artificial fishing lures and more particularly to that form of lures wherein whole fish or strips cut from fish are utilized with the artificial lure in combination as a lure.

This application is a continuation in part of my copending application, Serial No. 374,690, filed August 17, 1953, entitled Improvement in Bait Retaining Device, and now abandoned.

Many species of fish strike only live bait or small fish or simulation thereof. Thus the prior art of fishing lures for said types or species of fish is to provide either an artificial lure or to provide a "live" lure. The said "live" lure generally comprise a small fish or a strip of fish of the size of a small fish and the same were appropriately hooked so as to provide a desired action of the said "live" lure in the water.

A shortcoming of the prior art "live" lures was the life of the lure and the skill required from the fishermen in properly hooking the small fish or the strip of fish to provide the desired action.

With my invention, an artificial lure is utilized in combination with a fish of the appropriate size for bait and the desired action obtains in the water because of the construction and design of the artificial lure. Also with my invention, the fish or the strip of fish utilized in the combination has extremely long "life" in the water and the bait fish can be properly secured and with a minimum skill on the part of the fishermen.

Thus the primary objects of my invention are to provide a fish lure which utilizes as bait fish, whole fish or strips thereof in combination with an artificial lure and wherein uniform action of the combined lure obtains and with a maximum "life" or utility of the bait fish.

Other objects and advantages of my invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in this art.

Figure 1 is a top plan view of a fishing lure device embodying my invention and with the rear portion of the longer side wall being shown in a full line position and in a dotted line position for purposes of adjustment of the size of the spinning circles as hereinafter described;

Fig. 2 is a view in side elevation of the device of Fig. 1;

Fig. 3 is a bottom plan view of the said device;

Fig. 4 is a front elevational view taken substantially in the direction of broken line 4—4 of Fig. 2;

Fig. 5 is a perspective view and on a larger scale of the device of Figs. 1 to 4 and showing a bait-fish strip in place to illustrate a complete combination for use in fishing;

Fig. 6 is a somewhat schematic view on a smaller scale than the previous figures and showing the device in an operative position relative fishing tackle and a fragment of a hooked fish sought to be caught; and Fig. 7 is a schematic view illustrating the rolling action or spinning action of the lure in operation.

Referring now to the drawings, the lure of my invention comprises a body having a cavity therein and the cavity is defined by a top wall 10, a bottom wall 11, a side wall 12, a side wall 13, and a front wall 14. The side wall 13 is longer than the side wall 12 and the side wall 13 is curved over at least a portion of its length to present an external face of concave configuration to water passing alongside of the lure, while the lure is in operation. The end portion of the side wall 13 presenting said external face of concave configuration is numbered 13a.

A fishing leader is provided, such as a "nylon" leader or a steel wire with a "nylon" surface coating, and said leader is numbered 15. A forward portion of the lure body is provided with an aperture, such as an aperture 16 which is preferably located at about the juncture between the side wall 12, the front wall 14, and the top wall 10. Through the said aperture 16 is extended the leader 15 and the leader 15 passes through the cavity in the lure body and thence through an opening or aperture 33 positioned in close proximity to the tailward portion of the side wall concave portion 13a. Preferably a raised portion of material 17 is carried by said tailward portion of the concave wall portion 13a and the opening or aperture 33 is disposed through said raised portion 17 and the axis of said aperture 33 is aligned with the longitudinal axis of the lure. Preferably the side wall 12 is concavo-convex crosswise of the lure so that an opening or cavity is provided between the walls 10, 11, 12, 13, and 14 of a size and configuration to readily receive either a strip cut from a minnow or small fish or a whole minnow.

Preferably a pierced lead or a piece of lead having an opening therein threadedly receives the leader 15 and then the said lead 18 is squeezed to provide desired frictional engagement between the said lead 18 and the leader 15. Preferably the leader 15 is nylon or nylon covered steel wire to provide for suitable frictional engagement between the lead 18 and the leader. The forward end portion of the leader 15 engages suitable fishing gear as a swivel 30, lead weight 31, and fishing line 32, which line 32 extends to the fisherman.

In using the lure of my invention, a strip cut from fish, as a herring, may be utilized or a whole fish, as a herring, may be utilized and the head end portion of the said bait fish is placed within the cavity formed by the walls 10, 11, 12, 13, and 14. Then a suitable means as a portion of a toothpick is inserted through the openings 19 and 20 which are in the side walls 12 and 13 and which openings 19 and 20 are aligned to receive such a toothpick. Thereafter the end portions of the toothpick behind walls 12 and 13 are broken off so as not to cause undue frictional engagement with passing water.

In Fig. 5 of the drawings a strip of bait 21 is shown and hence the toothpick 22 is likewise shown in place.

The hook 23 which is shown secured to the trailing end portion of the leader 15 may be triple hook type of hook or may be a single hook type of hook. The hook 23 may be embedded in the strip of fish 21 if desired but I have found that such is not necessary. In order to adjust the length of the leader between the trailing end of the side wall 13a, the adjustable stop member 18 can be moved longitudinally on the leader 15 and the amount of leader trailing between the trailing end portion of the side wall 13a and the hook 23 will be established. Often times fish will tend to bite off the trailing end of the bait fish 21 and by appropriately disposing the hook 23 relative to the trailing end portion of the bait fish 21 such action can be prevented by causing the fish, which is to be caught, to strike the hook rather than the trailing end portion of the fish strip or whole fish 21 constituting a bait fish. The size of the bait fish should be selected as that appropriate for the fish desired to be caught.

When a fish to be caught illustrated by the fragment of fish 24 engages with the hook 23, the lure body may move forwardly as the lead 18 is engaged with the leader 15 and the body portion can move forward until the lead or stop 18 engages adjacent the opening 33 in the side wall 13a. Normally the lure body is positioned so that the stop member 18 is within the lure body and adjacent the opening 16 at the head end portion of the lure.

In use the lure body tends to roll or rotate about a longitudinal axis as is best illustrated in Fig. 7 of the drawings and provides a highly desired "action" of the combined lure in the water. In other words, the forward portion of the front wall 14 and portions of the top and side walls connected therewith turn about the longitudinal axis 25 and describe the circle 26. At the same time the trailing end portion of the side wall 13a describes the circle 27. By providing the concave portion on the outer surface of the side wall portion 13a, I increase the efficiency of the side wall portion 13a in controlling the turning action of the combined lure.

Preferably the top wall 10, bottom wall 11, and side walls 12 and 13 are made of a translucent or transparent material so that the markings of the fish strip 21 are at all times visible. Due to the motion of the lure as described in connection with Fig. 7, then the skin surface of the fish strip should be outwardly and with the meat side of the fish strip adjacent the inside wall of the outside wall portion 13a. Thus as the fish strip 21 revolves about the longitudinal axis 25, the normal natural markings on the skin of the fish strip 21 are exposed to view from the sides, top and bottom of the revolving fish strip 21. Of course if a whole fish is employed, then both sides of the fish will present natural markings of lure which is attractive to the type of fish being sought.

As an example, and not as a limitation, utilizing the lure of my invention, the same may be used in spinning, mooching, and trolling for salmon as found in the Pacific Northwest. Such salmon are cannibals and bite on "live" bait such as herring or candle fish. Thus if strips of fish are to be utilized, they may be approximately 4½ to 6 inches long and approximately 1 inch wide at their greatest width and approximately ¼ of an inch thick at their greatest thickness. A whole herring or minnow of appropriate dimensions can be utilized. The said "live" bait may be frozen before use and if so, it is preferably thawed out to a point where it is firm but not unduly limp. If fresh bait is used, the bait should be dead for a sufficient period of time so that it is firm and form retaining.

In my invention, the action of the lure and the associated bait fish is caused by the lure itself and thus it is not critical that bait fish having given characteristics should be employed.

The size of the roll or revolution as set forth by the circles 26 and 27 of Fig. 7 of the drawings can be altered by changing the relative angular position of the trailing side wall portion 13a to the general body portion of the lure and thus I have indicated a full line position in Fig. 1 of the drawings, as well as a dotted line position. If the lure is made of metal, then adjustments can be made by bending the portion 13a toward or away from its full line position shown in Fig. 1. The greater the angle, then the greater the size of the circles 26 and 27. Preferably, however, I form the wall portions 10, 11, 13, and 14 from a transparent plastic such as a thermoplastic and one type available on the market is sold as "Tenite No. 2" and others readily available are buturates and "nylons." The reason for a thermoplastic type of plastic is to provide one that can be heated and which will tend to soften by heat so that the adjustment illustrated in Fig. 1 of the drawings as to the trailing end portion 13a of the side wall 13 can be adjusted crosswise as indicated. Also the plastic should have sufficient durability and strength to stand up under fishing conditions. In this connection it is to be realized that the lure slides on the leader 15 and there is no direct strain on the lure when a fish strikes the lure.

It is to be noted that the leader 15 is described as passing out the forward end of the lure and about between the juncture of the side wall 12, the front wall 14, and the top wall 10. If this position is changed, then the roll at the front end portion of the lure about the circle 26 in Fig. 7 of the drawings, will be altered. It has been found that passing the leader 15 out at the location mentioned, tends to give a right roll or relatively small circle 26. Thus the location mentioned is the preferable location. As to the roll about the circle 27 of the tail portion 13a of the side wall 13, the roll at this area can be increased by adjusting the angular position of the tail portion 13a away from the longitudinal axis of the lure. It is not desired to have too large a roll and at the same time it is desired that the lure roll about or describe circles about an axis such as the axis 25 described in connection with Fig. 7.

Preferably the front wall 14 is painted with a fluorescent paint as an attraction. Red has been found to be a very suitable color for the said fluorescent paint.

The side wall 12 is not shown as a flat wall but is arched as shown best in Fig. 4 of the drawings and this is similarly true as to the forward portion of wall 13 so as to accommodate a whole fish as distinguished from a fish strip. Whenever a device is to be used solely with fish strips, then by heating, the thermoplastic walls can be reformed so as to provide for a tight fit of the fish strip within the cavity provided by the walls 10, 11, 12, 13 and 14.

A distinct advantage of my invention is that the cavity forming portions (walls 10, 11, 12, 13 and 14) provide for maintaining the fish bait in good condition so that it is not necessary to change bait as often as if the fish bait was used directly as a lure.

The angular position of the front wall 14 to the top wall 10 appears to be approximately 75°. If this angle is changed, then the extent of roll or the size of the circle 26 on Fig. 7 will be changed. Also the wall 14 is angularly disposed approximately 15° to a right angle or a line normal to the side wall 13. Again if this angle is changed, it will tend to change the size of the roll or circle 26. Similarly the position that the leader 15 passes out the forward end portion of the body cavity will change the size of the roll. From all of the factors, the combination as shown is that generally desired.

If the walls 10, 11, 12, 13, and 14 are to be formed of a plastic, the same can readily be produced by injection moulding and the unit may be produced in one piece. This, of course, is an advantage and hence it is preferable that the artificial lure portion of my invention be produced from a suitable plastic.

Obviously changes may be made in the form, dimensions, and arrangement of the parts of my invention, the above setting forth only a preferred form of embodiment.

I claim:

An artificial lure functioning in combination with bait fish comprising a body having a cavity therein for receiving the forward end portion of a bait fish, said cavity being defined by two side walls, a top wall, a bottom wall, and a front wall sloping backwardly from said top wall to said bottom wall, one of said side walls being longer than the other and being curved over at least a portion of its length to present an external face of concave configuration curving away from the longitudinal axis of the cavity, and fishing leader means connected with a forward portion of the body and connected with a trailing portion of the longer side wall.

References Cited in the file of this patent

UNITED STATES PATENTS

| | | |
|---|---|---|
| 2,088,775 | Davenport | Aug. 3, 1937 |
| 2,394,132 | Zeibig | Feb. 5, 1946 |
| 2,565,956 | Duhamel | Aug. 28, 1951 |
| 2,582,627 | Gaylord | Jan. 15, 1952 |
| 2,610,428 | Jones | Sept. 16, 1952 |